(12) United States Patent  
Malone

(10) Patent No.: US 11,985,956 B2
(45) Date of Patent: May 21, 2024

(54) DEPLOYABLE ANIMAL MEASURING PLATFORM

(71) Applicant: Emanuel Blake Malone, Locust Grove, GA (US)

(72) Inventor: Emanuel Blake Malone, Locust Grove, GA (US)

(*) Notice: Subject to any disclaimer, the term of this patent is extended or adjusted under 35 U.S.C. 154(b) by 211 days.

(21) Appl. No.: 17/511,460

(22) Filed: Oct. 26, 2021

(65) Prior Publication Data

US 2022/0125020 A1 Apr. 28, 2022

Related U.S. Application Data

(60) Provisional application No. 63/105,758, filed on Oct. 26, 2020.

(51) Int. Cl.
*A01K 29/00* (2006.01)
*G01B 3/06* (2006.01)
*G01B 3/08* (2006.01)
*G01G 17/08* (2006.01)
*G01G 19/50* (2006.01)
*G01G 19/52* (2006.01)
*G01G 21/22* (2006.01)
*G01G 21/28* (2006.01)

(52) U.S. Cl.
CPC .............. *A01K 29/00* (2013.01); *G01G 17/08* (2013.01); *G01G 19/52* (2013.01); *G01G 21/22* (2013.01); *G01G 21/28* (2013.01); *G01B 3/06* (2013.01); *G01B 3/08* (2013.01); *G01G 19/50* (2013.01)

(58) Field of Classification Search
CPC .. G01B 3/06; G01B 3/08; A01K 29/00; G01G 17/08; G01G 19/44; G01G 19/50; G01G 21/22; G01G 21/28
See application file for complete search history.

(56) References Cited

U.S. PATENT DOCUMENTS

| | | | | |
|---|---|---|---|---|
| 226,000 | A * | 3/1880 | Reynolds | G01G 19/02 177/126 |
| 2,181,272 | A * | 11/1939 | Greenleaf | G01G 19/44 177/126 |
| 2,539,570 | A * | 1/1951 | Cousineau | G01G 19/42 177/126 |
| 3,596,725 | A * | 8/1971 | Homs | G01G 23/00 177/246 |
| 4,134,213 | A * | 1/1979 | Kushmuk | G01B 3/08 33/512 |
| 4,696,360 | A * | 9/1987 | Homen | G01G 17/08 177/262 |

(Continued)

*Primary Examiner* — Randy W Gibson

(57) ABSTRACT

A deployable animal measuring platform suited for measuring dog height or any other dog body measurement profile is presented. The deployable animal measuring platform contains a base, a panel, and a measuring element. The panel is connected vertically perpendicular to the base through a fastening element, where the panel and the base is configured to assemble in a deployed configuration or a retracted configuration. In the retracted configuration, the base and the panel are folded and connected parallel to each other, such that the deployable animal measuring platform is easily transportable and stored. In the deployed configuration, the base is secured along a flat surface while the panel is erected vertically from the base. The measuring element traverses along the panel.

12 Claims, 7 Drawing Sheets

(56) References Cited

U.S. PATENT DOCUMENTS

| | | | | |
|---|---|---|---|---|
| 4,743,031 | A | * | 5/1988 | Lamle ................ A63F 9/0415 |
| | | | | 273/146 |
| 4,745,472 | A | | 5/1988 | Hayes |
| 4,753,031 | A | * | 6/1988 | Owen .................. A01K 97/00 |
| | | | | 206/315.11 |
| 5,044,453 | A | * | 9/1991 | Bankier ................ G01G 19/41 |
| | | | | 177/34 |
| 5,402,585 | A | | 4/1995 | Lund |
| 5,612,515 | A | * | 3/1997 | Eisen .................. G01G 19/445 |
| | | | | 177/127 |
| 6,222,137 | B1 | * | 4/2001 | Handford ........... G01G 19/083 |
| | | | | 177/126 |
| 6,256,896 | B1 | * | 7/2001 | Landauer ............... A61B 5/107 |
| | | | | 177/245 |
| 6,441,323 | B1 | * | 8/2002 | Montagnino ........ G01G 21/283 |
| | | | | 177/127 |
| 6,646,209 | B2 | * | 11/2003 | Montagnino .......... G01G 19/50 |
| | | | | 177/171 |
| 7,039,220 | B2 | | 5/2006 | Kriesel |
| 7,134,995 | B2 | | 11/2006 | Dodds |
| 8,707,908 | B2 | * | 4/2014 | Grave et al. ........... G01G 17/08 |
| | | | | 119/842 |
| 2008/0223625 | A1 | * | 9/2008 | Lawler .................. G01G 19/44 |
| | | | | 177/25.13 |
| 2008/0277169 | A1 | * | 11/2008 | Hong .................... G01G 19/50 |
| | | | | 177/180 |
| 2010/0224140 | A1 | | 9/2010 | Bareket |

\* cited by examiner

DEPLOYABLE ANIMAL MEASURING PLATFORM

The current application claims a priority to the U.S. Provisional Patent application Ser. No. 63/105,758 filed on Oct. 26, 2020.

FIELD OF THE INVENTION

The field of the present invention relates generally to devices for measuring the length of an object and methods of using the measuring device to accomplish the measurement objective. More particularly, the present invention relates to such devices and methods that are specifically configured to measure bodily portions of an animal.

BACKGROUND OF THE INVENTION

At dog shows, in those breeds where certain heights are specified in the standard for the particular breed as disqualifications or in any class where the conditions include a height specification, the dog show judge may be required to make a determination as to whether any dog measures within the specified limits. In the past, various types of equipment have been used which have resulted in considerable difficulties in providing for an accurate determination of the height of the dog. This is because it is often difficult to cause the dog under consideration to stand in an erect manner for a period long enough for the accurate measurement using rulers, tape measures, or the like, to be employed.

It is an objective of the present invention to provide a device which in a positive manner will assure accurate measurement in a very short time and with the dog shifting in the position of its shoulders and the like so that a reading of less than the dog's actual height cannot be made because the dog is incorrectly positioned during the measurement. The present invention is easily deployable along a targeted staging area. Once deployed the present invention features integrated measurement tools that provides a means of measuring the dog's height and other bodily profiles sufficiently along the present invention. Once the present invention is not in use, the user can fold it up in a manner such that it is easily transportable.

SUMMARY OF THE INVENTION

The present invention is a deployable animal measuring platform suited for measuring dog height or any other dog body measurement profile. The deployable animal measuring platform comprises a base, a panel, and a measuring element. The panel is connected vertically perpendicular to the base through a fastening element, where the panel and the base is configured to assemble in a deployed configuration or a retracted configuration. The base serves as the primary horizontal platform that the dog stands on top of when performing a measurement. The panel serves as the primary measurement portion of the present invention that constitutes the measuring components to measure the dog's height or any other dog body measurement profile, such as, but not limited to the dog's width, length, depth or any other dog body measurement profile. In the retracted configuration, the base and the panel are folded and connected parallel to each other, such that the deployable animal measuring platform is easily transportable and stored. In the deployed configuration, the base is secured along a flat surface while the panel is erected vertically from the base. The measuring element traverses along the panel.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
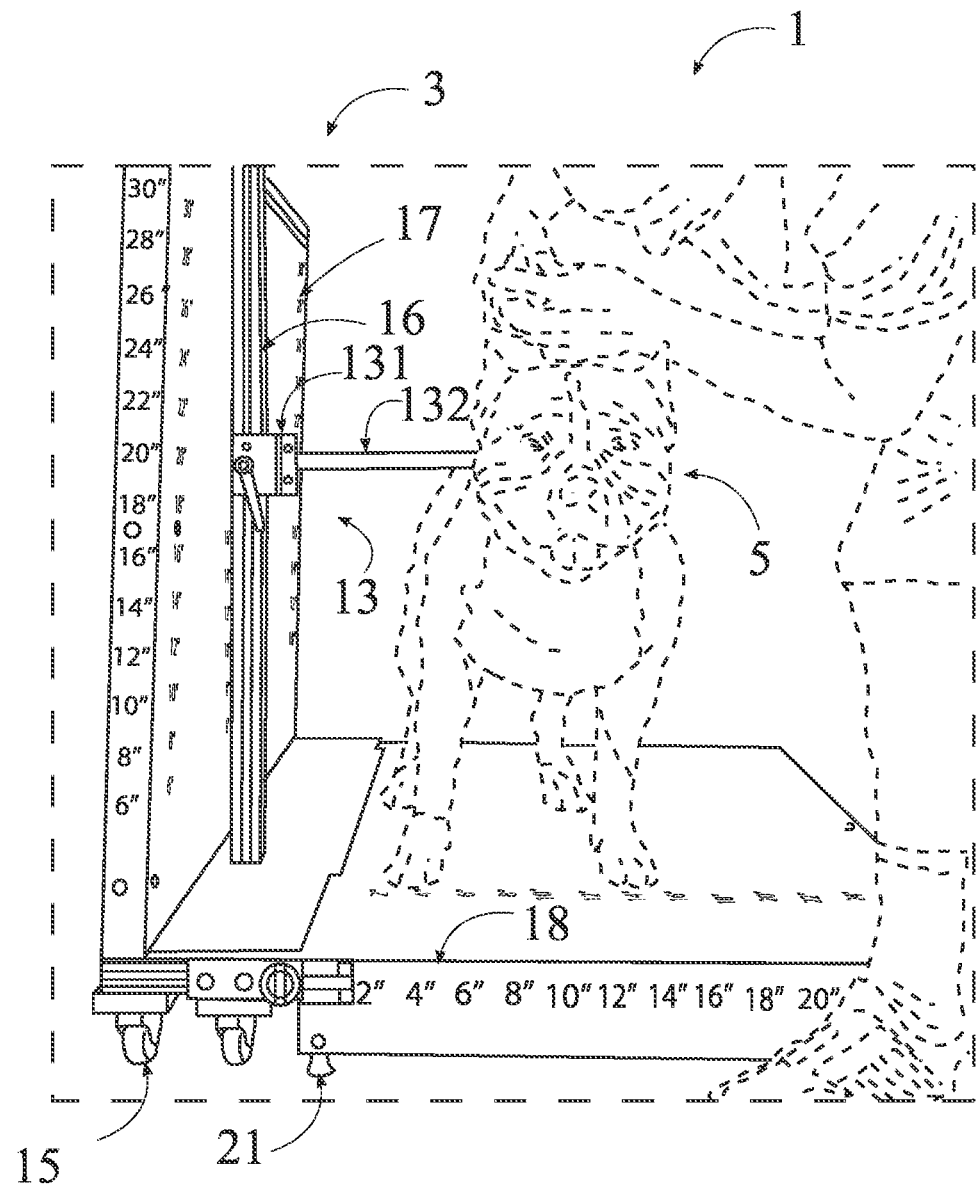
FIG. 1 is an illustration of the present invention.
Figure 2:
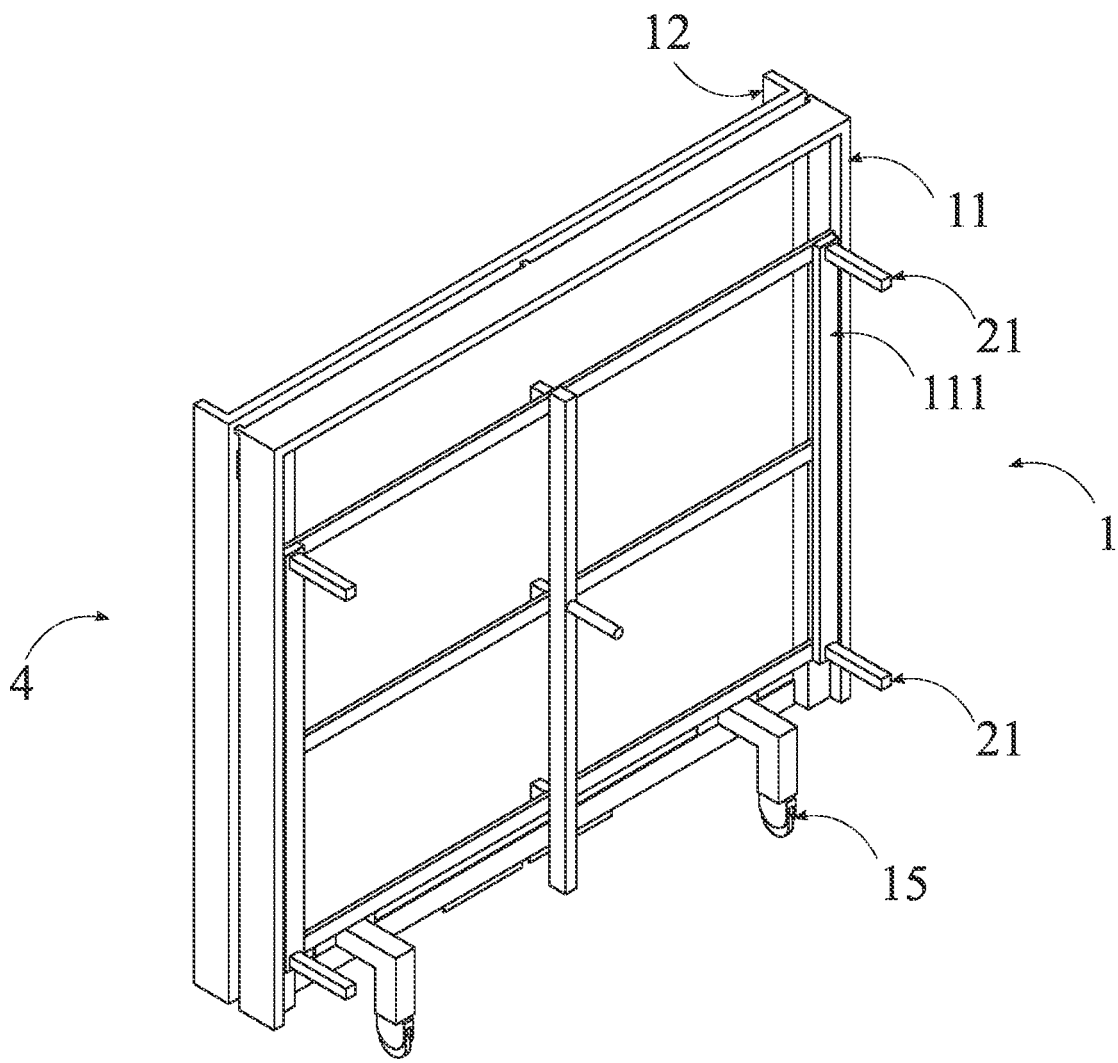
FIG. 2 is a top perspective view of the present invention, in accordance with a retracted position.
Figure 3:
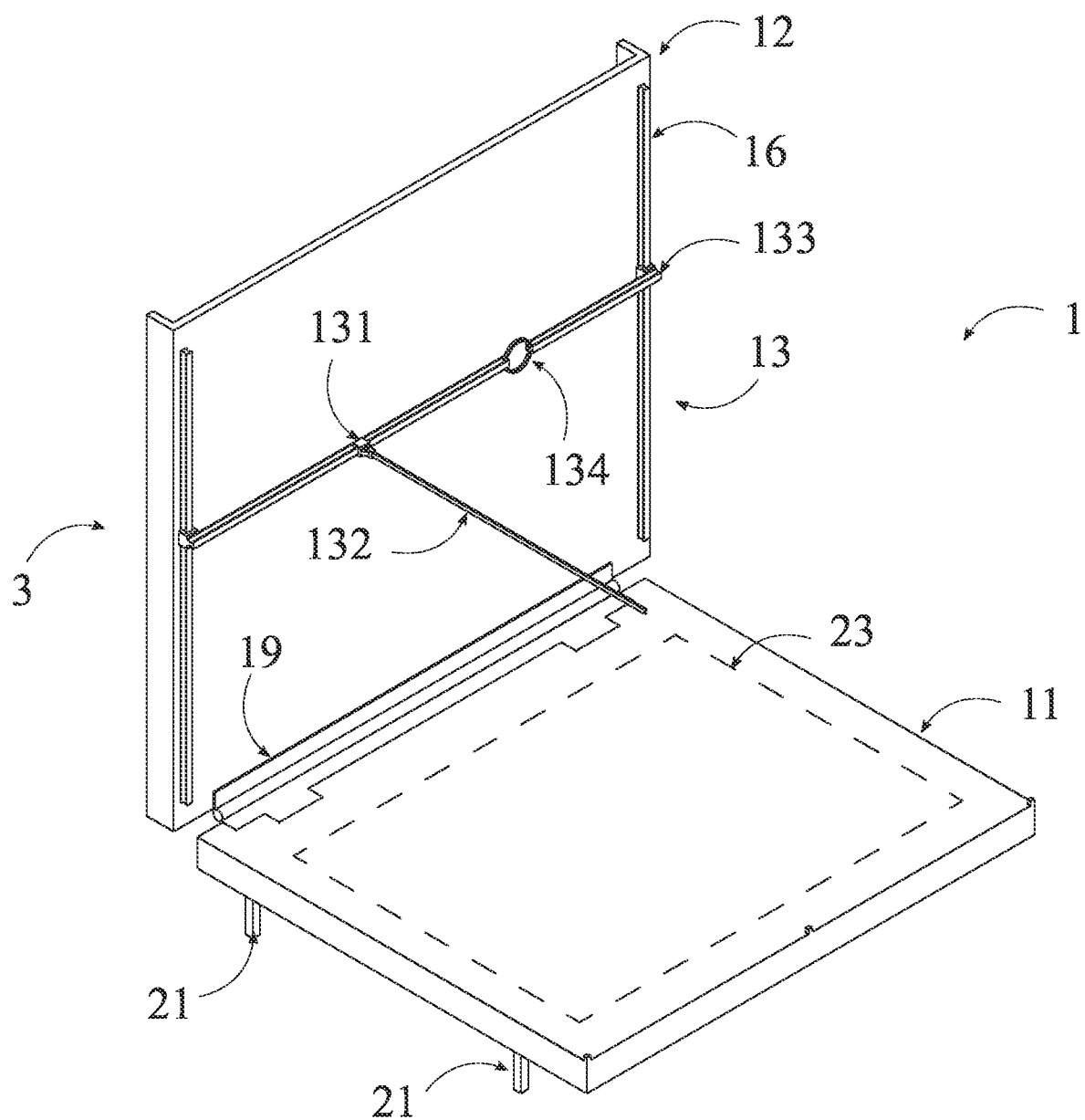
FIG. 3 is a top perspective view of the present invention, in accordance with a deployed position.

In reference to FIGS. 1-6, the present invention is a deployable animal measuring platform 1 suited for measuring dog 5 height or any other dog 5 body measurement profile. The deployable animal measuring platform 1 comprises a base 11, a panel 12, and a measuring element 13. The panel 12 is connected vertically perpendicular to the base 11 through a fastening element 14, where the panel 12 and the base 11 is configured to assemble in a deployed configuration 3 or a retracted configuration 4, as shown in FIGS. 2-3. The base 11 serves as the primary horizontal platform that the dog 5 stands on top of when performing a measurement. The panel 12 serves as the primary measurement portion of the present invention that constitutes the measuring components to measure the dog's 5 height or any other dog 5 body measurement profile, such as, but not limited to the dog's 5 width, length, depth or any other dog 5 body measurement profile. In the preferred embodiment of the present invention, the fastening element 14 may take the form of any suitable fastening element 14 that removably attaches the panel 12 to the base 11, such as, but not limited to couplers, connection brackets, angle brackets, screws, or any other suitable fastening element 14. In the retracted configuration 4, the base 11 and the panel 12 are folded and connected parallel to each other, such that the deployable animal measuring platform 1 is easily transportable and stored. In the deployed configuration 3, the base 11 is secured along a flat surface while the panel 12 is erected vertically from the base 11. The measuring element 13 traverses along the panel 12. In the preferred embodiment of the present invention, the measuring element 13 may take the form of any suitable measuring element 13 that allows a user to take a measurement of the dog 5 body measurement profile along the panel 12. In the preferred embodiment of the present invention, the measuring element 13 may take the form of a wither rod measuring device. In another embodiment, the measuring element 13 may take the form of an electronic measuring implement, such as, but not limited to an optical measurement device that employs laser optical sensors that digitally measures the dog 5 body measurement profile. In the preferred embodiment of the present invention, the deployable animal measuring platform 1 is made out a suitable durable and lightweight material, such as, but not limited to aluminum, wood, polymer plastics, fiberglass, or any other suitable material. In the preferred embodiment of the present invention, the deployable animal measuring platform 1 may be scaled to any size to accommodate any dog 5 breed bodily profile. In the preferred embodiment of the present invention, the deployable animal measuring platform 1 is rectangular in shape but may be any other suitable shape.

In reference to FIGS. 1-2 and 4-6, the deployable animal measuring platform 1 further comprises at least one caster 15. The at least one caster 15 is distributed about the base 11 and the panel 12. In the preferred embodiment of the present invention, the at least one caster 15 allows the deployable animal measuring platform 1 to roll freely along a flat surface when being transported in the retracted configuration 4, as shown in FIG. 3. In reference to FIGS. 1-2 and 4-6, the deployable animal measuring platform 1 further comprises at least one rail 16. The measuring element 13 comprises a shuttle 131 and a measuring rod 132. The at least one rail 16 vertically traverses along the panel 12. The shuttle 131 is slidably connected along the at least one rail 16. The measuring rod 132 is hingedly connected to the shuttle 131. In the preferred embodiment of the present invention, the at least one rail 16 may take the form of a slider rail that is mounted vertically along the panel 12 such that the at least one rail 16 slidably mounts the measuring element 13 along the panel 12. In the preferred embodiment of the present invention, the shuttle 131 serves as the measuring rod 132 connector mounted on the at least one rail 16. In the preferred embodiment of the present invention, the measuring rod 132 may take the form of a wither rod measurement device suitable for measuring the dog's 5 height along the panel 12.

Figure 4:
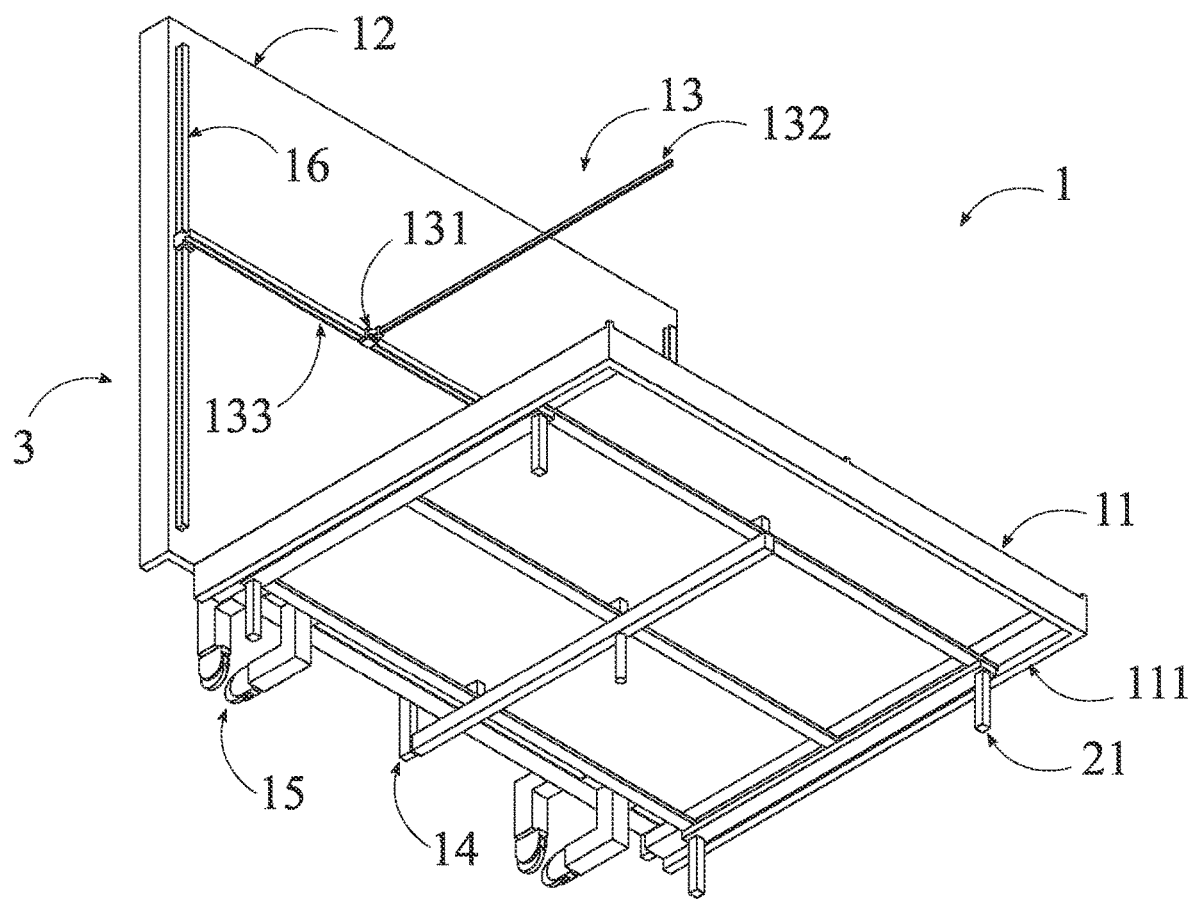
FIG. 4 is a bottom perspective view of the present invention, in accordance with a deployed position.
Figure 5:
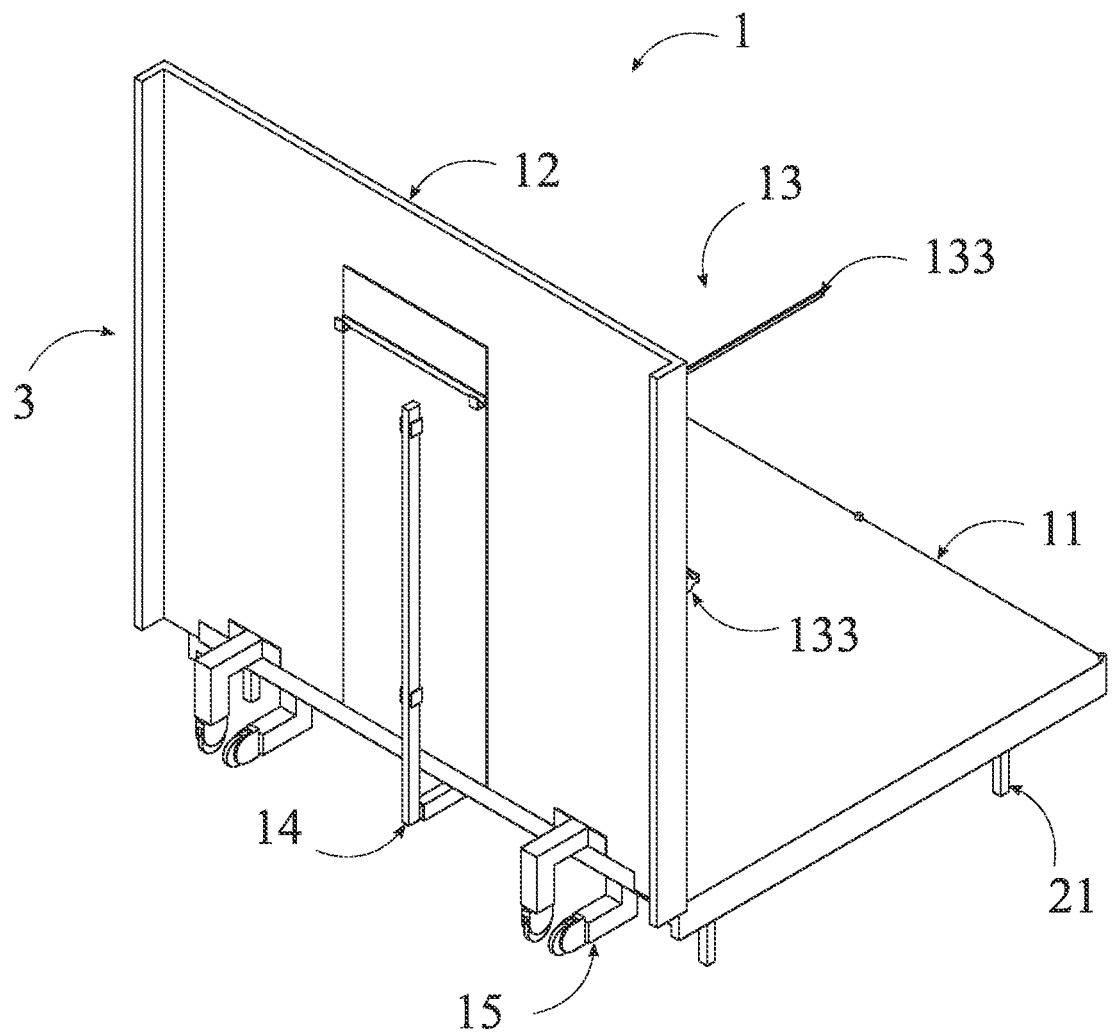
FIG. 5 is a rear-top perspective view of the present invention, in accordance with a deployed position.

In another embodiment, the measuring element 13 further comprises a measuring beam 133 and a viewing element 134. The at least one rail 16 vertically traverses along the panel 12, as shown in FIGS. 3-4. The measuring beam 133 is horizontally and slidably connected to the at least one rail 16. The shuttle 131 is slidably connected along the measuring beam 133. The measuring rod 132 is hingedly connected to the shuttle 131. The viewing element 134 is connected adjacent to the measuring beam 133. In this embodiment, the measuring beam 133 serves as a horizontal axis along the panel 12, serving as a horizontal measurement reference relative to the base 11. The viewing element 134 may take the form of a measurement sight-mark that assists the user in reading a measurement along the panel 12. The viewing element 134 may take the form of a view portal such as, but not limited to a magnification lens, or any other suitable measurement sight-mark implement.

In the preferred embodiment of the present invention, the deployable animal measuring platform 1 further comprises a plurality of measurement indicia 17. The plurality of measurement indicia 17 is distributed about the panel 12. In another embodiment, the plurality of measurement indicia 17 is distributed about the base 11. The plurality of measurement indicia 17 may take the form of pre-labelled measurement annotations along the base 11 or the panel 12 to aid in making measurements in that measurement annotation standard. This annotation standard may take the form of any suitable standard, such as, but not limited to metric or imperial measurement standards. In one embodiment, the plurality of measurement indicia 17 may take the form of etched measurements along the panel 12. In another embodiment, the plurality of measurement indicia 17 may take the form of printed decals.

In the preferred embodiment of the present invention, the deployable animal measuring platform 1 further comprises at least one measuring board insert 18, as shown in FIG. 1. The at least one measuring board insert 18 is distributed about the base 11. Additionally, the at least one measuring board insert 18 is distributed about the panel 12. The plurality of measurement indicia 17 is distributed about each of the at least one measuring board insert 18. In the preferred embodiment of the present invention, the at least one measuring board insert 18 may take the form of removable measuring board inserts installed on the sides of the base 11 or panel 12 or directly along the base 11 or panel 12. The at least one measuring board insert 18 allows a user to easily swap the at least one measuring board insert 18 along any side of the base 11 or the panel 12 to accommodate side measurements or different measurement standards. The at least one measuring board insert 18 removably attaches along the base 11 or the panel 12 through any suitable fastening implement, such as, but not limited to magnets, screw fasteners, quick detach implements or any other suitable fastening implement.

Figure 6:
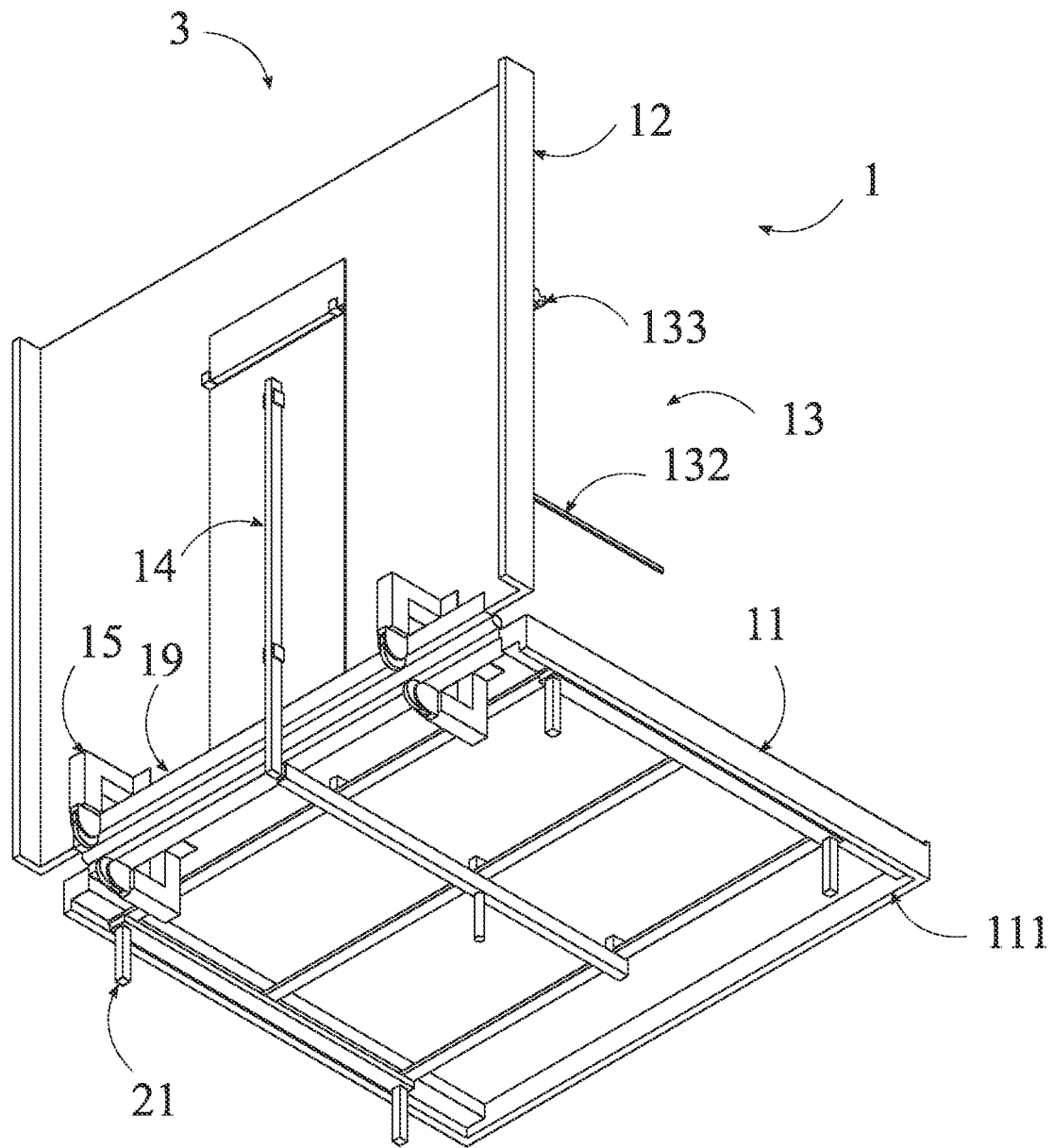
FIG. 6 is a rear-bottom perspective view of the present invention, in accordance with a deployed position.
Figure 7:
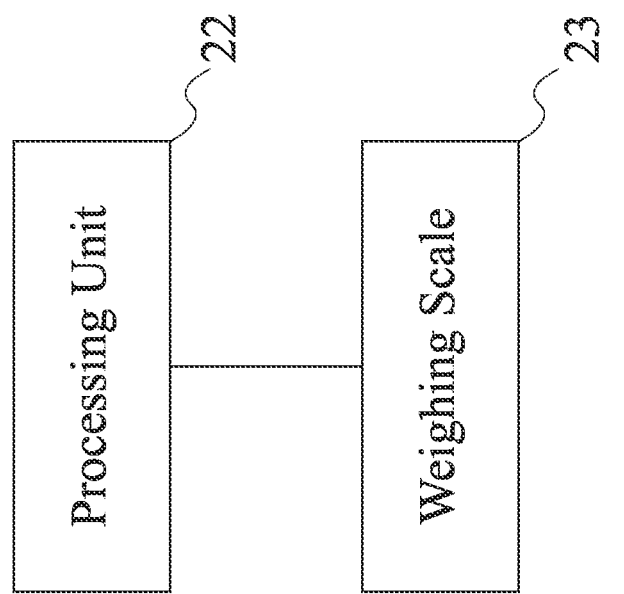
FIG. 7 is a circuit diagram used in the present invention.

In the preferred embodiment of the present invention, the panel 12 is hingedly connected to the base 11 through a hinge fastener 19, as shown in FIGS. 2-6. The hinged connection between the base 11 and the panel 12 allows the user to fold the base 11 to the panel 12, such that the base 11 and the panel 12 are parallel to each other in an upright position, as shown in FIG. 2. This assumes the retracted configuration 4, allowing the user to transport or store the deployable animal measuring platform 1 easily. In the preferred embodiment of the present invention, the deployable animal measuring platform 1 further comprises a plurality of legs 21, as shown in FIGS. 1-6. The base 11 comprises a mounting surface 111, as shown in FIGS. 4 and 6. The mounting surface 111 traverses along the base 11, opposite to the panel 12. The plurality of legs 21 is distributed about the mounting surface 111. In the preferred embodiment of the present invention, the plurality of legs 21 may take the form of support legs that elevates and secures the base 11 from the flat surface the deployable animal measuring platform 1 is secured along. In another embodiment of the present invention, the deployable animal measuring platform 1 further comprises a processing unit 22 and a weighing scale 23. The weighing scale 23 traverses along the base 11. The weighing scale 23 is electronically connected to the processing unit 22. In this embodiment, the weighing scale 23 may take the form of an electronic scale that allows the user to measure the dog's 5 weight along the base 11, where the electronic scale is configured to the processing unit 22, and where the processing unit 22 serves as the user interface device that calculates and displays the weight of the dog 5 along the base 11 of the scale. In one embodiment, the user interface device may take the form of a wireless communication user interface device, such as, but not limited to a smartphone, tablet, or any other suitable device. In another embodiment, the weighing scale 23 may take the form of an analog weighing scale 23, where the analog weighing scale 23 provides a purely mechanical means of measuring the dog's 5 weight with no power source required.

Although the invention has been explained in relation to its preferred embodiment, it is to be understood that many other possible modifications and variations can be made without departing from the spirit and scope of the invention as hereinafter claimed.

What is claimed is:

1. A deployable animal measuring platform comprising:
   a base;
   a panel;
   a measuring element;
   the panel being connected vertically perpendicular to the base through a fastening element, wherein the panel and the base is configured to assemble in a deployed configuration or a retracted configuration;
   the measuring element traversing along the panel;
   at least one caster; and
   the at least one caster being distributed about the base and the panel.

2. The deployable animal measuring platform as claimed in claim 1, comprising:
   at least one rail;
   the measuring element comprising a shuttle and a measuring rod;
   the at least one rail vertically traversing along the panel;
   the shuttle being slidably connected along the at least one rail; and
   the measuring rod being hingedly connected to the shuttle.

3. The deployable animal measuring platform as claimed in claim 1, comprising:
   at least one rail;
   the measuring element comprising a measuring beam, a shuttle, a measuring rod, and a viewing element;
   the at least one rail vertically traversing along the panel;
   the measuring beam being horizontally and slidably connected to the at least one rail;
   the shuttle being slidably connected along the measuring beam;
   the measuring rod being hingedly connected to the shuttle; and
   the viewing element being connected adjacent to the measuring beam.

4. The deployable animal measuring platform as claimed in claim 1, comprising:
   a plurality of measurement indicia; and
   the plurality of measurement indicia being distributed about the panel.

5. The deployable animal measuring platform as claimed in claim 1, comprising:
   a plurality of measurement indicia; and
   the plurality of measurement indicia being distributed about the base.

6. The deployable animal measuring platform as claimed in claim 1, comprising:
   a plurality of measurement indicia;
   at least one measuring board insert;
   the at least one measuring board insert being distributed about the base; and
   the plurality of measurement indicia being distributed about each of the at least one measuring board insert.

7. The deployable animal measuring platform as claimed in claim 1, comprising:
   a plurality of measurement indicia;
   at least one measuring board insert;
   the at least one measuring board insert being distributed about the panel; and
   the plurality of measurement indicia being distributed about each of the at least one measuring board insert.

8. The deployable animal measuring platform as claimed in claim 1, comprising:
   the panel being hingedly connected to the base through a hinge fastener.

9. The deployable animal measuring platform as claimed in claim 1, comprising:
   a plurality of legs;
   the base comprising a mounting surface;
   the mounting surface traversing along the base, opposite to the panel; and
   the plurality of legs being distributed about the mounting surface.

10. The deployable animal measuring platform as claimed in claim 1, comprising:
    a processing unit;
    a weighing scale;
    the weighing scale traversing along the base; and
    the weighing scale being connected adjacent to the processing unit.

11. The deployable animal measuring platform as claimed in claim 1, wherein the measuring element is a wither rod measuring device.

12. The deployable animal measuring platform as claimed in claim 1, wherein the measuring element is an optical measuring device.

* * * * *